(12) United States Patent
Canioni et al.

(10) Patent No.: US 7,709,798 B2
(45) Date of Patent: May 4, 2010

(54) TERAHERTZ OPTICAL GATE

(75) Inventors: Lionel Canioni, Gradignan (FR);
Rysvan Maleck-Rassoul, Pessac (FR);
Patrick Mounaix, St Denis de Pile (FR);
Laurent Sarger, Talence (FR)

(73) Assignees: Commissariat a l'Energie Atomique, Paris (FR); Centre National de la Recherche Scientifique, Paris (FR); L'Universite de Bordeaux I, Talence (FR)

( * ) Notice: Subject to any disclaimer, the term of this patent is extended or adjusted under 35 U.S.C. 154(b) by 45 days.

(21) Appl. No.: 11/574,983

(22) PCT Filed: Oct. 5, 2005

(86) PCT No.: PCT/FR2005/050813

§ 371 (c)(1),
(2), (4) Date: Mar. 9, 2007

(87) PCT Pub. No.: WO2006/040487

PCT Pub. Date: Apr. 20, 2006

(65) Prior Publication Data

US 2008/0029712 A1    Feb. 7, 2008

(30) Foreign Application Priority Data

Oct. 8, 2004    (FR) ................... 04 52307

(51) Int. Cl.
*G02F 1/29* (2006.01)
(52) U.S. Cl. .................... 250/341.1; 359/299
(58) Field of Classification Search .......... 250/341.1; 359/241, 244, 299
See application file for complete search history.

(56) References Cited

U.S. PATENT DOCUMENTS 5,661,594 A * 8/1997 Rhoads et al. ............. 359/299
6,144,512 A   11/2000 Eden

OTHER PUBLICATIONS

Sang-Gyu Park, et al. "Analysis of Terahertz Waveforms Measured by Photoconductive and Electrooptic Sampling", IEEE Journal of Quantum Electronics, XP-000851527, vol. 35, No. 5, May 1999, pp. 810-819.

Rick Trebino, et al. "Using Phase Retrieval to Measure the Intensity and Phase of Ultrashort Pulses: Frequency-Resolved Optical Gating", Journal of the Optical Society of America, XP000363246, vol. 10, No. 5, May 1993, pp. 1101-1111.

* cited by examiner

*Primary Examiner*—David P Porta
*Assistant Examiner*—Djura Malevic
(74) *Attorney, Agent, or Firm*—Oblon, Spivak, McClelland, Maier & Neustadt, L.L.P.

(57) ABSTRACT

This invention relates to a wide band optical gate in the terahertz domain (wavelengths in the far infrared). It comprises a first optical source (2) emitting a first beam (FTHz) in said terahertz domain, a first plate made of a semiconducting material (1) illuminated by said terahertz beam and a second optical source (3) emitting a second beam (FIR) at a wavelength capable of saturating the first plate (1) made of a semi-conducting material and making it reflective at terahertz wavelengths. This invention also relates to a system for measuring terahertz signals and to a terahertz generator. It is particularly applicable to systems for measuring terahertz signals and to terahertz generators.

18 Claims, 4 Drawing Sheets

TERAHERTZ OPTICAL GATE

TECHNICAL DOMAIN

The invention relates to a wide band optical gate in the far infrared or submillimetric or terahertz domain. It also relates to a matrix of optical gates. It is particularly applicable to a terahertz pulse detector and to measurement of this signal. It is also applicable to a terahertz generator.

STATE OF PRIOR ART

Wide band terahertz pulses are usually detected in so-called TDS (time domain spectroscopy) architectures by:
  measuring the current induced by excitation of photoconductors by ultra-short laser pulses.
  measuring the optical birefringence induced by an electro-optical effect, by terahertz radiation, in a non-linear semiconducting crystal on an ultra short reference laser pulse.
Two different processes are known for generation of wide band terahertz pulses:
  excitation of photoconductors by ultra short laser pulses. The spectrum radiated during the conduction spike is easily spread on several terahertz.
  optical rectification in transparent materials for generation of intense terahertz fields, the intensity of which is proportional to optical excitation.

In order to obtain intense terahertz fields, the electromagnetic flux is severely limited in the case of photoconduction due to saturation of inter-band absorption. Adjustment of photoconductor illumination is severely constrained by the dimensions of the useful area.

In the case of optical rectification, the generation efficiency of terahertz radiation requires the use of even more intense laser sources. Therefore, ultra short amplified laser pulses that are usually low frequency, expensive and difficult to use, usually have to be used. Furthermore, a critical detection adjustment is essential.

PRESENTATION OF THE INVENTION

The invention can solve these difficulties.

Therefore, the invention relates to a wide band optical gate in the terahertz domain (wavelengths in the far infrared). It comprises:
  a first optical source emitting a first beam in the said terahertz domain,
  a first plate made of a semiconducting material illuminated by said terahertz beam, and
  a second optical source emitting a second beam at a wavelength capable of saturating the first plate made of a semi-conducting material and making it reflective at terahertz wavelengths.

Preferably, the pulses of the second beam are delayed by a time that can be adjusted with respect to terahertz pulses in the first beam.

In principle, the pulses of the second beam take place at the same repetition rate as the terahertz pulses of the first beam.

According to one embodiment of the invention, delays of the different pulses from the second beam within a given time are different such that these different pulses explore different time positions in the terahertz pulses in the first beam.

According to another embodiment, the gate according to the invention comprises a second plate made of a semiconducting material illuminated by a third beam with a wavelength capable of saturating this second plate and making it reflective at terahertz wavelengths. This second plate is preferably located along the direction of the terahertz beam transmitted by the first plate.

It could be arranged that the pulses in the third beam are delayed by a constant time with respect to pulses in the second beam.

Advantageously, the wavelengths of the second and the third beam (FIR, FIR') are located in the infrared.

Also advantageously, the first and second plates are made of silicon.

The invention also relates to a matrix or a row of optical gates applying the optical gate thus described. The first and/or the second beam(s) then selectively illuminate different zones of the plate made of a semiconducting material, each said zone forming an optical gate.

The invention also relates to a measurement system applying the gate thus described. This measurement system comprises an optical detection and signal measurement apparatus, located along the direction of the terahertz beam reflected by the first plate.

According to one variant embodiment, this measurement system comprises an optical detection and signal measurement apparatus located along the direction of the terahertz beam transmitted by the second plate.

The invention also relates to a terahertz generator applying the previously described optical gate. This generator comprises a first terahertz cavity comprising a gain medium located in a second laser cavity and pumped by the signal of this second cavity. The first cavity also comprises a plate made of a semiconducting material that can be illuminated at saturation by optical pulses supplied by the first cavity.

It is arranged that the first cavity and the second cavity have equivalent optical lengths in order to obtain synchronized pumping of the two cavities.

Furthermore, it could advantageously be arranged that the second laser cavity is a cavity which operates in the infrared range.

BRIEF DESCRIPTION OF THE DRAWINGS

The different purposes and characteristics of the invention will become clearer after reading the following description, with reference to the appended figures, wherein.

DETAILED DESCRIPTION OF PARTICULAR EMBODIMENTS

The invention is based on the use of photoconduction of semiconducting materials to manipulate a sub-millimetric radiation.

Figure 1A:
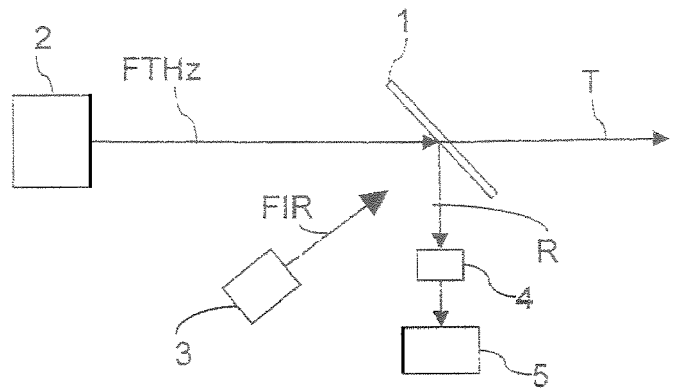
FIG. 1a represents an optical gate used to measure the energy of a terahertz signal.
Figure 1B:
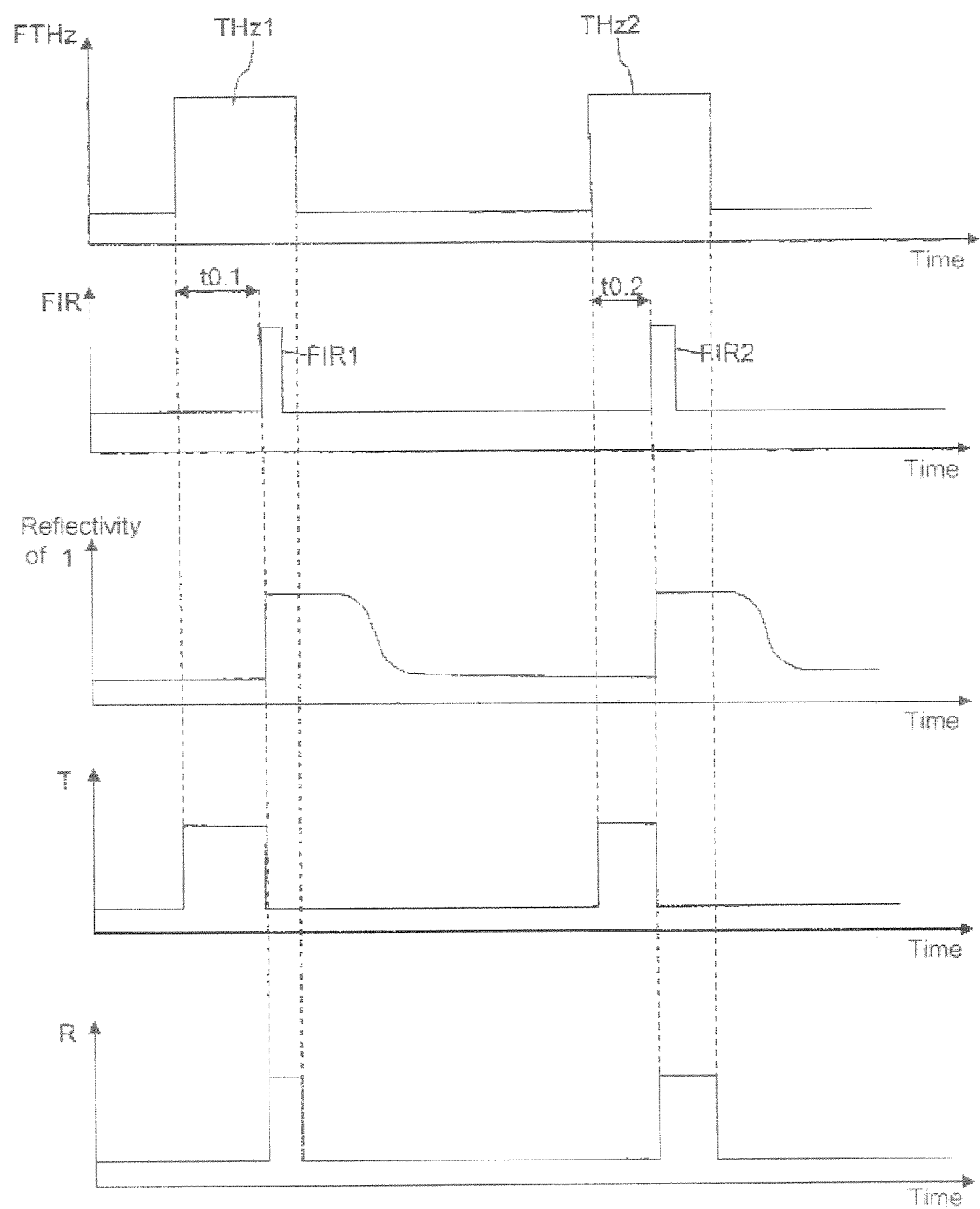
FIG. 1b represents an operating time diagram for the gate in FIG. 1a, FIG. 2a represents a double optical gate used to measure the energy and delay of a terahertz signal.

With reference to FIGS. 1a and 1b, we will start by describing an extra-cavity architecture in which a terahertz beam is intercepted by a semiconducting plate.

An optical source 2 emits an optical beam FTHz in the far infrared field (terahertz wavelength band) that illuminates a plate 1 made of a semiconducting material. Furthermore, the plate 1 may be illuminated by an infrared beam FIR emitted by an infrared source 3. The plate made of a semiconducting material may be saturated by this infra-red radiation FIR and when it is saturated. It becomes reflecting to light from the terahertz beam FTHz. In the absence of infrared radiation, the plate 1 is transparent (or almost transparent) to the terahertz beam FTHz.

A device 4 collects and detects light transmitted by the plate 1. This device 4 transmits an electrical signal corresponding to measurement apparatus 5.

FIG. 1b shows an operating time diagram for the system in FIG. 1a.

The first time diagram represents terahertz pulses transmitted to the plate made of a semiconducting material 1.

The second time diagram shows infrared pulses FIR designed to make the plate 1 reflecting. These FIR pulses are offset in time from the terahertz pulses FTHz by a variable delay t0.1, t0.2, etc.

The reflectivity response time of the semiconducting material from which the plate 1 is made (represented by the third diagram) is short compared with the rise time of the terahertz field. Furthermore, the semiconducting material from which the plate 1 is made has a long reflectivity fall time compared with the duration of a terahertz pulse, but shorter than the terahertz pulse repetition period.

Plate 1 acts as a wide band metallic mirror (or wide band optical gate) and then reflects energy with very high efficiency (more than 80%) towards a wide spectrum detector with a large time constant (possibly a bolometer).

The fourth time diagram represents the terahertz signal T transmitted by the plate 1.

The fifth time diagram represents the terahertz signal R reflected by the plate 1.

Preferably, the pulse signal FIR has the same repetition rate as the pulse signal FTHz and is advantageously derived from this signal. Pulses such as FIR1 are synchronised with pulses such as THz1 with the delays mentioned above.

According to the invention, delays such as t0.1 are varied. Therefore, the times t0.1, t0.2 are different from each other and preferably progress continuously. Measurements of reflected beams R made by the measurement apparatus 5 for a large number of pulses (THz1) of the terahertz beam FTHz, are thus used to obtain the integral of the terahertz signal. A simple derivative then rebuilds the signal in energy resolved in time.

Figure 2A:
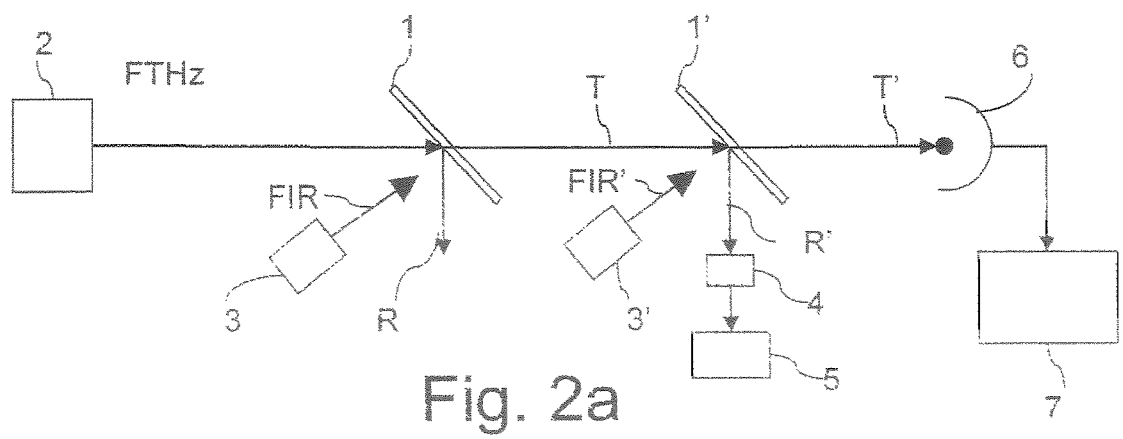
FIG. 2b represents an operating time diagram for the system in FIG. 2a, FIG. 3 represents application of the invention to an example terahertz generator.

FIG. 2a represents a variant of the system in FIG. 1a in which two plates 1 and 1' made of a semi-conducting material are arranged in series along the direction of the terahertz beam emitted by the source 2. Each gate is illuminated independently by infrared pulses emitted by sources 3 and 3'.

Figure 2B:
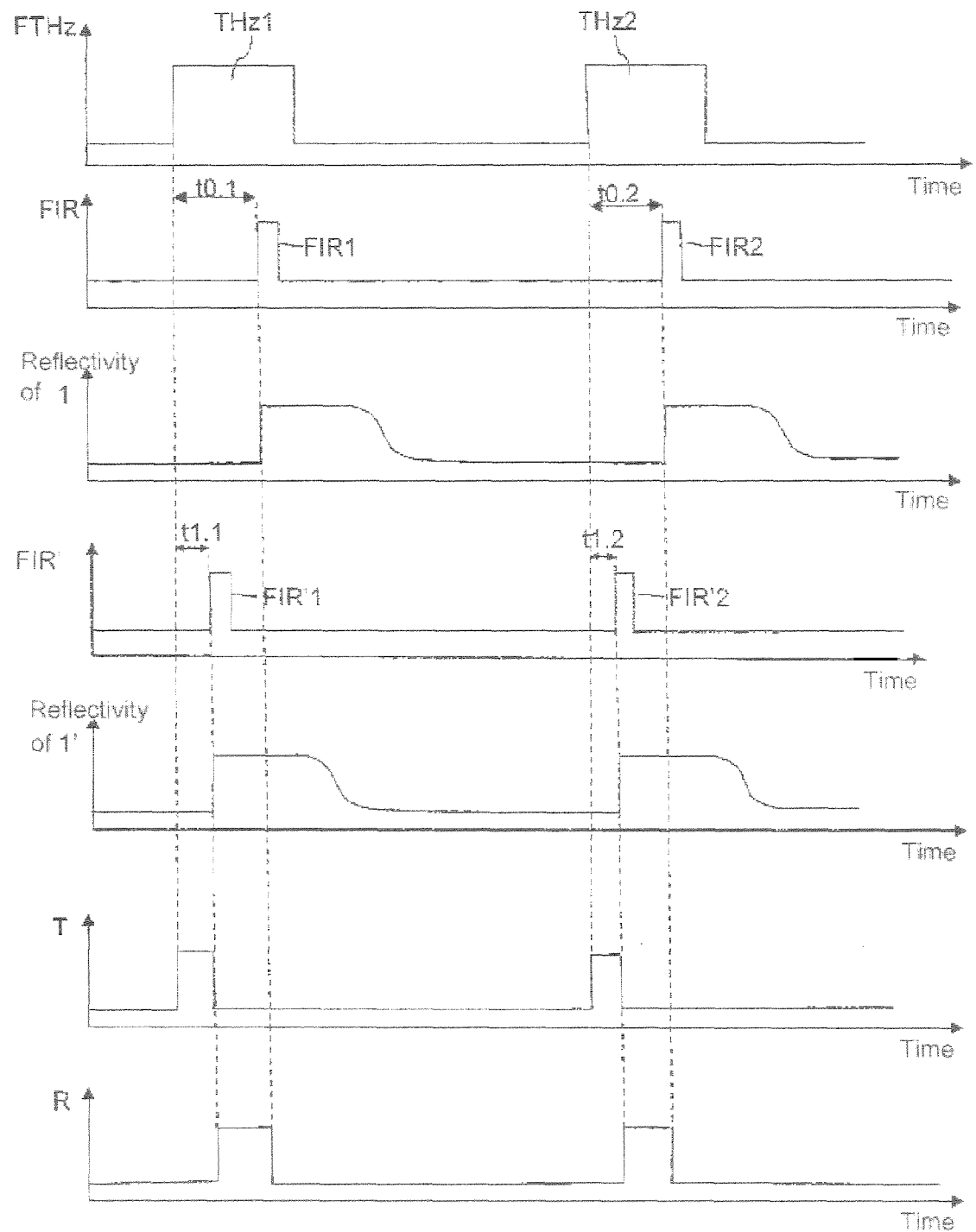

As before, the pulses FIR emitted by the source 3 are offset in time compared with the terahertz pulses FTHz. This delay varies. FIG. 2b shows that the pulses FIR1, FIR2 are delayed by t0.1, t0.2 respectively with respect to the terahertz pulses.

Pulses such as FIR'1, FIR'2 emitted by the source 3' have a constant delay with respect to the pulses emitted by the source 3. These pulses FIR'1, FIR'2 are respectively delayed by t1.1, t1.2 with respect to the terahertz pulses.

During illumination of the plate 1 by the pulses FIR, the plate 1 reflects terahertz pulses in the form of pulses R1, R2, R3 (see FIG. 2b). The plate 1 can thus chop the terahertz pulses and only transmit the portions of the terahertz pulses between the front edges of the terahertz pulses and the front edges of the FIR pulses to the second plate 1', in other words during the delays t0.1 and t0.2 (see second and third time diagrams in FIG. 2b).

Therefore, the plate 1' only receives the terahertz pulses transmitted by the plate 1. The plate 1' is made reflecting (fourth diagram in FIG. 2b) by pulses FIR'. It remains reflecting during a time that exceeds the duration of the pulses FIR'. Therefore, in the terahertz pulses transmitted by plate 1, the front edge of the pulses FIR'1, FIR'2 chops the transmitted pulses T' and the reflected pulses R' (see sixth and seventh diagrams in FIG. 2b).

Therefore, the seventh diagram in FIG. 2b shows that the duration of the terahertz pulses reflected by the plate 1' is defined by the front edges of pulses FIR and FIR'.

The series of pulses FIR1, FIR2 and FIR'1, FIR'2 are offset in time by a constant delay (see above). The result is that the duration of the pulses R' reflected by the second plate 1' is constant.

Since each plate 1 and 1' forms a gate, a fraction of each terahertz pulse is reflected in R' when the plate 1 is not reflecting and when the plate 1' is reflecting.

The system reflects terahertz pulses R' each corresponding to a fraction of a terahertz pulse. These different terahertz pulses R' are located at different instants in successive input terahertz pulses FTHz due to variations firstly in the delays t0.1, t0.2 and secondly in delays t1.1 and t1.2.

The pulses T'1, T'2, T'3 are collected and detected by the device 6 that transmits the corresponding electrical pulses to a processing circuit 7.

Under these conditions, two items of information can be accessed in the terahertz field:
the square of the field in time, and
the delay.

These two items of information can also lead to a complete description of the field (amplitude and phase).

By varying the delay t, the signal is directly reconstructed with the detector, with a sufficiently short opening to limit the concept of noise.

Therefore, it can be seen that the optical gate according to the invention, placed in front of an ultra sensitive integrator detector (bolometer) can be used to detect radiation.

The terahertz pulse detection system according to the invention described above is just as sensitive as systems that make use of photoconductors or the electro-optical effect. The system according to the invention also has the advantage that it does not require any particular setting of the detector located behind the optical gate.

Figure 3:
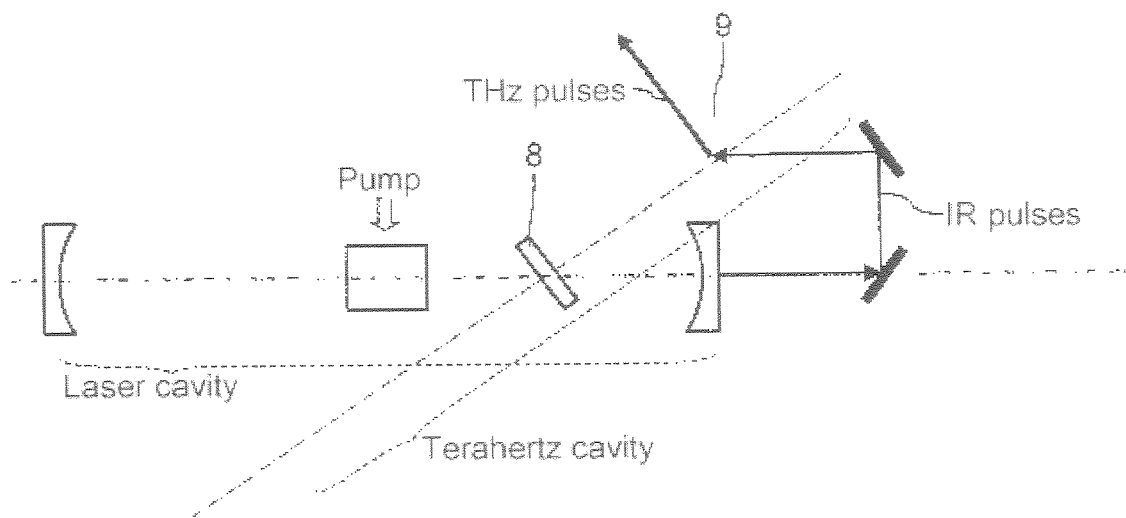

We will now describe an application of the invention to a terahertz generator, with reference to FIG. 3.

Intense fluxes can be obtained in the terahertz domain without the use of amplified laser systems by the insertion of a photo conducting element, or more generally a terahertz wave generator inside a cavity operating in the high frequency pulse range (ideally a laser with blocked modes in the femtosecond range in the infrared). The energy of the radiated field in the terahertz domain is modest but at high frequency, it corresponds to the energy of the oscillator. A cavity can be built up so as to collect and accumulate this wave synchronously (or sub synchronously) with the oscillator, if the cavity lengths are compatible.

Preferably, the cavity lengths will be equivalent for the laser cavity and for the terahertz cavity, so as to achieve this synchronism.

The technological difficulty of this supercavity relatively modest considering the relatively long wavelengths in the terahertz domain and the duration of the terahertz pulse equal to a few picoseconds. In fact, there is question of making a synchronous OPO (optical parametric oscillator) in the terahertz domain.

This cavity with a high quality power can be provided with an auxiliary intra-cavity focus and a plate made of a semiconducting material inclined at the Brewster angle to limit losses. Under these conditions, a pulse from the (optical) primary laser cavity correctly delayed in time and selected by an associated means is sent on the plate made of a semiconducting material 9. This has the consequence of transforming the plate into a reflecting mirror that will act as a cavity extractor if the response time is sufficiently short to return to rest after each extraction (and thus maintain an attractive terahertz radiation generation recurrence rate). Such a compact architecture can deliver terahertz powers comparable to the powers obtained with systems including amplifiers for infrared lasers.

Therefore, it can be seen that the gate according to the invention can be used to extract almost all the wide spectrum radiation of a pulsed source (cavity extractor function) from a storage cavity.

This terahertz generator forms an alternative to the use of amplified ultra short laser pulses, operating at a lower frequency to generate intense terahertz waves.

The invention is also applicable to an optical gates matrix. To achieve this, as shown on FIG. 4, it is assumed that a plate 1 made of a semiconducting material comprises a matrix of zones 1.0, 1.1, . . . , 1.n. Each zone can be illuminated selectively by one or more terahertz beams and by one or more infrared beams. Each zone on plate 1 forms an optical gate and simultaneous illumination of a zone by a terahertz beam and by an infrared beam activates the gate corresponding to this zone.

Figure 4:
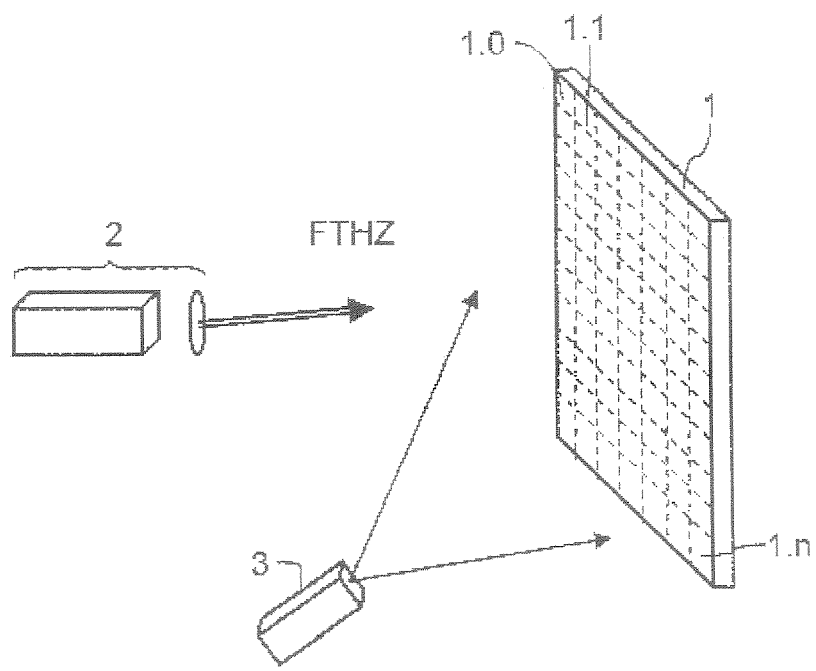
FIG. 4 represents an optical gate matrix system.

For example, FIG. 4 shows the optical source 3 providing a beam FIR that illuminates the entire surface of the plate 1 and that prepares operation of all gates. The optical sour provides a beam FTHz that selectively illuminates zones 1.0 to 1.n of plate 1 and that triggers individual operation of each gate.

Other operating modes could be envisaged without departing from the scope of the invention.

The invention claimed is:

1. A wide band optical gate in the terahertz domain, comprising:
   a first optical source configured to emit a first beam at a first wavelength in the terahertz domain;
   a first plate made of a semiconducting material illuminated by the first beam; and
   a second optical source configured to emit a second beam at a second wavelength on said first plate so as to saturate the first plate made of a semiconducting material,
   wherein the semiconducting material of the first plate is such that, when said first plate is not saturated with said second beam, said semiconducting material of said first plate has a reflectivity at said first wavelength that is lower than a reflectivity at said first wavelength when said first plate is saturated with said second beam,
   wherein pulses of the second beam are delayed by a time that is adjustable with respect to pulses in the first beam.

2. An optical gate as set forth in claim 1, in which the pulses of the second beam take place at a same repetition rate as the pulses of the first beam.

3. An optical gate as set forth in claim 2, in which delays of the different pulses from the second beam within a given time are different, such that the different pulses explore different time positions in the pulses.

4. An optical gate as set forth in claim 3, further comprising a second plate made of a semiconducting material illuminated by a third beam with a wavelength capable of saturating the second plate and making the second plate reflective at terahertz wavelengths, the second plate being located along the direction of the terahertz beam transmitted by the first plate.

5. An optical gate as set forth in claim 4, in which the pulses in the third beam are delayed by a constant time with respect to pulses in the second beam.

6. A measurement system making use of the gate as set forth in claim 4, the measurement system comprising an optical detection and signal measurement apparatus, located along the direction of the terahertz beam transmitted by the second plate.

7. An optical gate as set forth in claim 4, in which the wavelength of the third beam is located in the infrared.

8. An optical gate as set forth in claim 4, in which the second plate is made of silicon.

9. An optical gate as set forth in claim 1, in which the wavelength of the second beam is located in the infrared.

10. An optical gate as set forth in claim 1, in which the first plate is made of silicon.

11. A matrix or row of optical gates applying the optical gate as set forth in claim 1, in which the first beam and/or the second beam selectively illuminate different zones of the plate made of a semiconducting material, each zone forming an optical gate.

12. A measurement system applying the gate as set forth in claim 1, comprising an optical detection and signal measurement apparatus, located along the direction of the terahertz beam reflected by the first plate.

13. A terahertz generator applying the optical gate as set forth in claim 1, the generator comprising:
   a first terahertz cavity comprising a gain medium located in a second laser cavity and pumped by the signal of the second laser cavity, and a plate made of a semiconducting material that can be illuminated at saturation by optical pulses supplied by the first cavity.

14. A generator as set forth in claim 13, in which the first cavity and the second cavity have equivalent optical lengths.

15. A terahertz generator as set forth in claim 13, in which the second laser cavity operates in the infrared range.

16. An optical gate as set forth in claim 1, wherein said semiconducting material of said first plate is substantially transparent at said first wavelength when said first plate is not saturated with said second beam.

17. An optical gate as set forth in claim 16, wherein said semiconducting material of said first plate reflects at said first wavelength with more than 80% efficiency when said first plate is saturated with said second beam.

18. An optical gate as set forth in claim 1, wherein the pulses of the second beam are delayed, with respect to the pulses of the first beam, such that the semiconductor material only transmits portions of the first beam between front edges of the pulses of the first beam and front edges of the pulses of the second beam.

* * * * *